(12) United States Patent
Roh

(10) Patent No.: US 7,852,548 B2
(45) Date of Patent: Dec. 14, 2010

(54) ELECTROPHORETIC DISPLAY APPARATUS

(75) Inventor: Nam-Seok Roh, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 13 days.

(21) Appl. No.: 12/355,304

(22) Filed: Jan. 16, 2009

(65) Prior Publication Data

US 2010/0033802 A1 Feb. 11, 2010

(30) Foreign Application Priority Data

Aug. 11, 2008 (KR) .................. 10-2008-0078546

(51) Int. Cl.
*G02B 26/00* (2006.01)
*G09G 3/34* (2006.01)

(52) U.S. Cl. .................. 359/296; 359/452; 345/107

(58) Field of Classification Search .............. 359/296, 359/452; 345/76, 107, 204; 204/450, 600; 313/483

See application file for complete search history.

(56) References Cited

U.S. PATENT DOCUMENTS

| 5,411,656 | A | * | 5/1995 | Schubert | ............... | 345/107 |
| 5,582,700 | A | | 12/1996 | Bryning et al. | | |
| 6,117,368 | A | * | 9/2000 | Hou | ............... | 252/572 |

FOREIGN PATENT DOCUMENTS

| JP | 2007-148441 | 6/2007 |
| KR | 10-0662200 | 12/2006 |
| KR | 10-0790216 | 12/2007 |

* cited by examiner

*Primary Examiner*—Loha Ben
(74) *Attorney, Agent, or Firm*—F. Chau & Associates, LLC

(57) ABSTRACT

A electrophoretic display includes a first electrode comprising a plurality of nanoparticles, a second electrode opposite to the first electrode and forming an electric field with the first electrode, and an emulsion interposed between the first electrode and the second electrode. The emulsion comprises a non-polar solvent forming a continuous phase of the emulsion, and a polar solvent dispersed in the non-polar solvent of the emulsion and forming droplets controlled by the electric field.

20 Claims, 11 Drawing Sheets

ELECTROPHORETIC DISPLAY APPARATUS

CROSS-REFERENCE TO RELATED APPLICATION

This application relies for priority upon Korean Patent Application No. 2008-78546 filed on Aug. 11, 2008 the disclosure of which is hereby incorporated by reference in its entirety.

BACKGROUND OF THE INVENTION

1. Technical Field

The present disclosure relates to an electrophoretic display apparatus. More particularly, the present disclosure relates to an electrophoretic display apparatus having high transparency.

2. Description of the Related Art

Recently, as various electronic appliances such as mobile phones, PDAs (Personal Digital Assistants), computers and large-scale televisions have been developed, the demand for flat panel display devices applicable to the electronic appliances has also increased. Recently, e-paper capable of substituting for real paper has been spotlighted.

In general, e-paper is obtained by using electrophoresis that provides a high contrast ratio and has no dependency on view angles.

Such electrophoretic display apparatuses using electrophoresis include REED (Reverse Emulsion Electrophoretic Display, U.S. Pat. No. 5,582,700) devices developed by Zikon Corporation. The REED technology realizes images by interposing an emulsion of a non-polar continuous phase and a polar dispersed phase between an upper transparent electrode and a lower transparent electrode, and by applying a voltage between the upper and lower transparent electrodes.

However, in the REED devices of Zikon Corporation, large droplets are formed because the starting point is not defined on the electrodes upon polarization. Therefore, the REED devices have low transparency.

Accordingly, there is a need in the art for an electrophoretic display apparatus having improved transparency.

SUMMARY OF THE INVENTION

Exemplary embodiments of the present invention may provide an electrophoretic display apparatus having improved transparency in comparison to the conventional art.

In accordance with an exemplary embodiment of the present invention, an electrophoretic display device is provided. The electrophoretic display includes a first electrode comprising a plurality of nanoparticles, a second electrode opposite to the first electrode and forming an electric field with the first electrode, and an emulsion interposed between the first electrode and the second electrode. The emulsion comprises a non-polar solvent forming a continuous phase of the emulsion, and a polar solvent dispersed in the non-polar solvent of the emulsion and forming droplets controlled by the electric field.

The first electrode and the second electrode may formed to be in contact with a first substrate and a second substrate, respectively, and any one of the two electrodes may further include a thin film transistor to apply a voltage to the electrodes according to display signals.

The non-polar solvent and polar solvent may form droplets, which are controlled by the electric field between the first electrode and the second electrode.

The emulsion may further include a surfactant, if desired, to allow the polar solvent to form reverse micelles easily in the non-polar solvent.

For example, the non-polar solvent that may be used in the emulsion includes $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{2-30}$ esters, $C_{3-30}$ thioesters, terpenes, $C_{2-30}$ organosilanes, and $C_{2-30}$ organosiloxanes. Such non-polar solvents may be used alone or in combination.

For example, the polar solvent that may be used in the emulsion includes alcohols, amines, amides, ketones, carboxylic acids and their salts, glycols, polyethers, sulfides, sulfonic acid and their salts, sulfates, phosphides, phosphites, phosphonites, phosphinites, phosphates, phosphonates, phosphinates, imides, nitriles, isonitriles, amidines, nitro compounds, nitroso compounds, sulfoxides, sulfonates, thiols, and water. Such polar solvents may be used alone or in combination.

For example, the polar solvent includes DMSO (dimethyl sulfoxide), DMF (dimethyl formamide), methanol, ethanol, nitromethane, acetonitrile, methoxyethanol, methyl cellosolve, monoethyl ether, or a combination thereof.

The polar solvent may further include a dye that is not soluble in the non-polar solvent. The dye that may be used includes, for example, at least one dye selected from the group consisting of monazo dyes, diazo dyes, triphenylmethane dyes, pyrazolone dyes, acridines, porphyrines, diformazan dyes, squarain dyes, oxazines, formazan dyes, colored metals and transition metal complexes, metal salts, acid anthraquinone dyes, amphoteric anthraquinone dyes, diphenylmethane dyes, polymethine dyes, thiazines, phthalocyanines, tetrazolium dyes and combinations thereof.

The polar solvent may have a positive charge or negative charge. When a voltage is applied to the first and the second electrodes, the polar solvent may be conglomerated into droplets on the oppositely charged electrode.

The nanoparticles may be at least one type of nano-scale particles with a diameter of about 100 nm or less. The nanoparticles may include, for example, nanowires, carbon nanotubes, nanorods, or nanoribbons. The nanoparticles formed into the electrodes are spaced apart from each other at an interval less than about 5 µm, so as to form smaller droplets. For example, the nanoparticles are spaced apart from each other at an interval of about 200 nm or less, which is smaller than a half of the wavelength of visible rays.

Additionally, the first electrode may further include a support that supports the nanoparticles. The support may include, for example, a filler including a resin.

The electrophoretic display apparatus according to one aspect of the present invention may be formed to have flexibility. For example, the substrate may be a flexible substrate.

According to the electrophoretic display apparatus of exemplary embodiments of the present invention, the electrode including the nanoparticles may cause a non-uniform variation in the electric field formed on the electrode. By virtue of such a variation in the electric field, aligning points of the polar solvent are defined and droplets conglomerated on such aligning points result in a reduction in the size of the droplet. Therefore, the electrophoretic display apparatus may provide improved transparency.

BRIEF DESCRIPTION OF THE DRAWINGS

Exemplary embodiments of the present invention can be understood in more detail from the following description taken in conjunction with the accompanying drawings wherein.

DESCRIPTION OF THE EXEMPLARY EMBODIMENTS OF THE INVENTION

Figure 1:
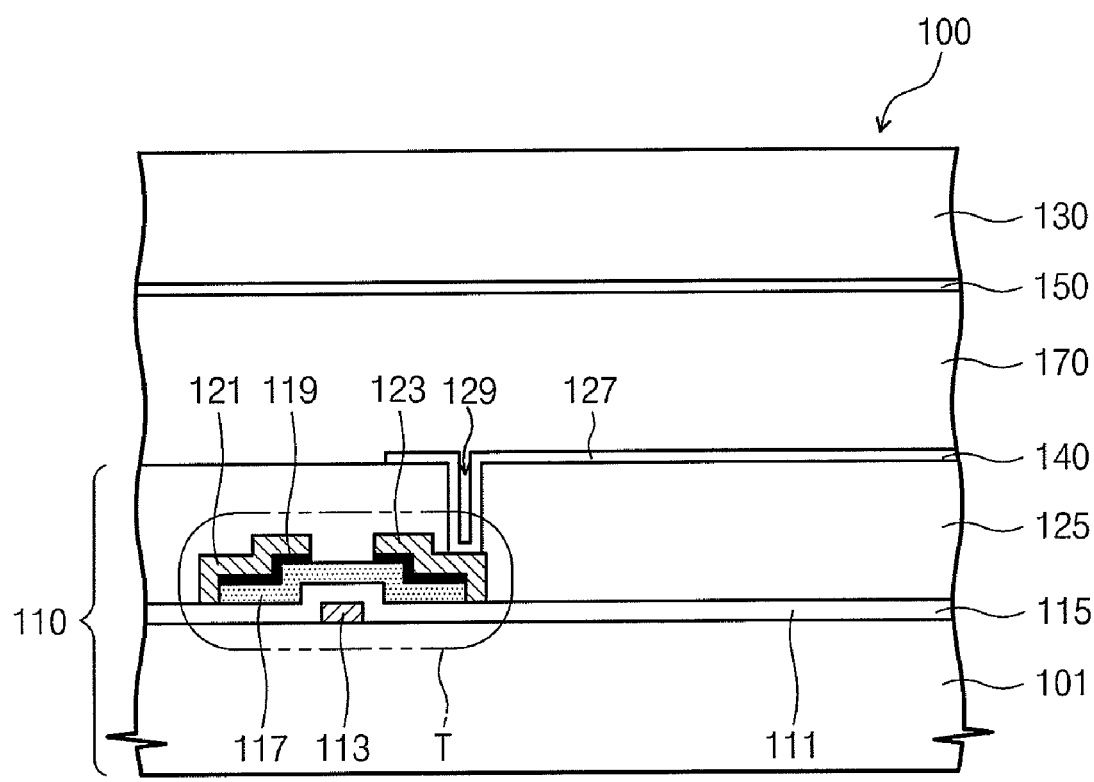
FIG. 1 is a sectional view illustrating the electrophoretic display apparatus according to an exemplary embodiment of the present invention.

Hereinafter, the electrophoretic display apparatus according to an exemplary embodiment of the present invention will be explained in detail with reference to the accompanying drawings. It should be understood that the present invention is not limited to appended drawings but includes all modifications, equivalents and alternatives within the spirit and scope of the present invention as defined in the following claims. The appended drawings are not necessarily to scale, presenting a somewhat extended or reduced representation of partial elements to illustrate various layers and regions more clearly. In the figures, reference numerals refer to the same or equivalent parts of the present invention throughout the figures of the drawing.

As used herein, the expression, "one layer (film) is formed (disposed) 'on' another layer (film)" includes not only a case wherein the two layers (films) are in contact with each other but also a case wherein an additional layer (film) is present between the two layers (film).

In an aspect, the present invention provides an electrophoretic display apparatus that forms an image through the modulation of an electric field to control the relative phase separation of a non-polar continuous phase and a polar non-continuous phase in an emulsion.

As used herein, the terms 'continuous phase' and 'dispersed phase' are related to a dispersion system which is a material system consisting of a first material forming a homogeneous phase and a second material dispersed in the first material in the form of fine particles. In such a dispersion system, the term 'continuous phase' is opposed to the term 'dispersed phase', and means a first phase surrounding a second phase dispersed in the system having two phases mixed therein and present continuously. The dispersed phase means the second phase dispersed in the continuous phase.

Additionally, the term 'emulsion' refers to a heterogeneous system consisting of a continuous phase and a non-continuous phase capable of forming droplets in the continuous phase.

The continuous phase or the dispersed phase may be in a solid, liquid or gas phase, as desired. Hereinafter, for the sake of convenience, example embodiments of the present invention will be explained with reference to a liquid phase. However, the scope of the present invention is not limited thereto.

According to an exemplary embodiment of the present invention, a non-polar solvent forms the continuous phase of an emulsion. A polar solvent is dispersed in the form of droplets in the non-polar solvent, as the non-continuous phase of the emulsion. A dye that is insoluble in the non-polar solvent is included in the polar solvent.

The emulsion optionally further includes a surfactant. When a surfactant is used in the polar solvent, the surfactant may be partially dissolved in the non-polar solvent.

The polar solvent may be colorless or may be colored depending on the dye. The dye may be dissolved in the polar solvent. The polar solvent having a color like as the dye may also serve in order to function as both the dye and the polar solvent.

The non-polar solvent may be colorless or may be colored.

The emulsion realizes a color from the color of the non-polar solvent in one way, and the combined color of the polar solvent, the dye and the non-polar solvent in other way. The color of the emulsion results from a contrast created between the colors in two ways.

An electric field is used to provide energy to transport and conglomerate the polar solvent rather than the non-polar phase. When the electric field is applied into the emulsion, the polar solvent in the non-polar solvent is conglomerated, or the polar solvent is separated from the non-polar solvent.

In addition, the dye, the polar solvent or the surfactant used in the electrophoretic display apparatus may have a positive charge or a negative charge. When a charged dye, a charged polar solvent or a charged surfactant is used, it moves toward the adjacent oppositely charged electrode upon the formation of the electric field.

The distribution of the polar solvent within the non-polar solvent of the emulsion is controlled by adjusting the frequency, amplitude and/or polarity of the electric potential applied across the electrophoretic display apparatus. In general, the distribution of the polar solvent within the non-polar solvent depends on the separation between the electrodes used in the display apparatus, the amplitude of the voltage, the voltage offset and the voltage frequency. These variables are dependent upon the particular properties of the non-polar and polar solvents used in the emulsion.

FIG. 1 is a sectional view illustrating the electrophoretic display apparatus according to an exemplary embodiment of the present invention.

Referring to FIG. 1, the electrophoretic display apparatus 100 according to an exemplary embodiment of the present invention includes a first substrate 110, a second substrate 130 and an emulsion 170 formed between the two substrates 110,130.

A first electrode 140 is formed on the first substrate 110.

The first substrate 110 includes a first insulating substrate 101, a thin film transistor T formed on the first insulating substrate 101, and a protection layer 125 formed on the thin film transistor T.

The insulating substrate 101 may include, for example, a transparent hard insulating material such as glass or crystal, or a transparent flexible material such as a plastic.

Gate lines and data lines are formed on the insulating substrate 101 in such a manner that the gate lines and the data lines are arranged vertically and horizontally to define pixel regions. The thin film transistor T is formed on the intersections of the gate lines and the data lines.

The thin film transistor T includes a gate electrode 113 forming a part of the gate lines, a source electrode 121 connected to the data lines, and a drain electrode 123 connected to the first electrode 140. The gate electrode 113 is formed on the first insulating substrate 101 while being connected to the gate lines. A gate dielectric layer 115 is formed on the gate electrode 111, and the gate lines and the gate dielectric layer includes an insulating material. For example, the gate dielectric layer 115 includes silicon nitride (SiNx) or silicon oxide (SiOx), and covers the whole surface of the first substrate 110 having the gate electrode 113.

An active layer 117 is formed on the gate dielectric layer 115 in such a manner that it is stacked on the gate electrode 113. The active layer 117 is formed by, for example, patterning an amorphous silicon layer or polycrystalline silicon. An ohmic contact layer 119 is formed on the active layer 117 by using, for example, amorphous silicon or polycrystalline silicon doped with impurities.

The source electrode 111 is formed on the gate dielectric layer 115 and the ohmic contact layer 119. The source electrode 111 is connected to the data lines and spaced apart from the drain electrode 123. Herein the present exemplary embodiment, the source electrode 121 and the drain electrode 123 are made in same step as the data lines, and therefore the source electrode 121 and the drain electrode 123 include the same material as the data lines.

The protection layer 125 is formed on the gate dielectric layer 115, the active layer 117, the source electrode 121 and the drain electrode 123 for the purpose of insulation and planarization. The protection layer 125 includes at least one of, for example, inorganic protection layers and organic protection layers, and may improve the insulation and off characteristics of the thin film transistor T. Additionally, a contact hole 129 is formed on the protection layer 125 so that the drain electrode 123 is partially exposed through the contact hole 129.

The first electrode 140 is formed on the protection layer 125. The first electrode 140 is connected to the drain electrode 123 of the thin film transistor T through the contact hole 129. For example, the first electrode 140 includes a plurality of nanoparticles and may further include a support by which the nanoparticles are supported. For example, the support includes a filler including a resin.

A second electrode 150 is formed on the second substrate 130. The second electrode 150 forms an electric field with the first electrode 140 in the space between the first electrode 140 and the second electrode 150 when voltages are applied on the first and the second electrode.

FIGS. 2-5 are sectional views illustrating how the electrophoretic display apparatus 100 according to an exemplary embodiment of the present invention displays an image, as taken in the absence of the thin film transistor.

The electrophoretic display apparatus 100 according to an exemplary embodiment of the present invention includes a plurality of pixels. For the sake of convenience, only one pixel is shown in the figures.

The electrophoretic display apparatus 100 according to an exemplary embodiment of the present invention includes the first substrate 110, and the second substrate 130 opposite to the first substrate 110. The first substrate 110 and the second substrate 130 are spaced apart from each other, and the emulsion 170 is formed on the space between the two substrates 110,130. Sidewalls 179 may be further provided to define the space more clearly between the first substrate 110 and the second substrate 130.

The first electrode 140 and the second electrode 150 are disposed on the first substrate 110 and the second substrate 130, respectively, to form an electric field between the first substrate 110 and the second substrate 130.

The emulsion provided between the two substrates 110, 130 includes, for example, a non-polar solvent 171 and a polar solvent 173. The non-polar solvent 171 forms a continuous phase of the emulsion 170, while the polar solvent 173 forms a non-continuous phase of the emulsion 170, e.g. a dispersed phase. In the exemplary embodiment as shown in FIGS. 2-5, the space between the two substrates 110,130 is substantially filled with the phases of the polar solvent 173 and the non-polar solvent 171 forming the emulsion 170.

The polar solvent 173 may further include a dye 175, for example, that is not soluble in the non-polar solvent 171 but is soluble in the polar solvent 173 to realize a colored appearance. The dye 175 may have various colors including, for example, a white color and a black color. However, the polar solvent 173 itself may have a color. In this case, the dye 175 is not needed.

In addition, the emulsion 170 may further include, for example, a detergent containing a surfactant to weaken the surface between the non-polar solvent 171 and the polar solvent 173. The polar solvent 173 as a dispersed phase is more easily dispersed in the non-polar solvent 171 as a continuous phase by the surfactant.

For example, the non-polar solvent 171 forming the continuous phase of the emulsion 170 includes at least one solvent selected from the group consisting of $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{2-30}$ esters, $C_{3-30}$ thioesters, terpenes, $C_{2-30}$ organosilanes, $C_{2-30}$ organosiloxanes, and mixtures thereof.

For example, the polar solvent 173 that may be used in the emulsion includes at least one solvent selected from the group consisting of alcohols, amines, amides, ketones, carboxylic acids and their salts, glycols, polyethers, sulfides, sulfonic acid and their salts, sulfates, phosphides, phosphites, phosphonites, phosphinites, phosphates, phosphonates, phosphinates, imides, nitriles, isonitriles, amidines, nitro compounds, nitroso compounds, sulfoxides, sulfonates, thiols, water, and mixtures thereof.

For example, the polar solvent 173 includes DMSO (dimethyl sulfoxide), DMF (dimethyl formamide), methanol, ethanol, nitromethane, acetonitrile, methoxyethanol, methyl cellosolve, monoethyl ether, or a mixture thereof.

The dye that is soluble in the polar solvent 173 includes, for example, at least one dye selected from the group consisting of monazo dyes, diazo dyes, triphenylmethane dyes, pyrazolone dyes, acridines, porphyrines, diformazan dyes, squarain dyes, oxazines, formazan dyes, colored metals and transition metal complexes, metal salts, acid anthraquinone dyes, amphoteric anthraquinone dyes, diphenylmethane dyes, polymethine dyes, thiazines, phthalocyanines, tetrazolium dyes and combinations thereof.

Figure 2:
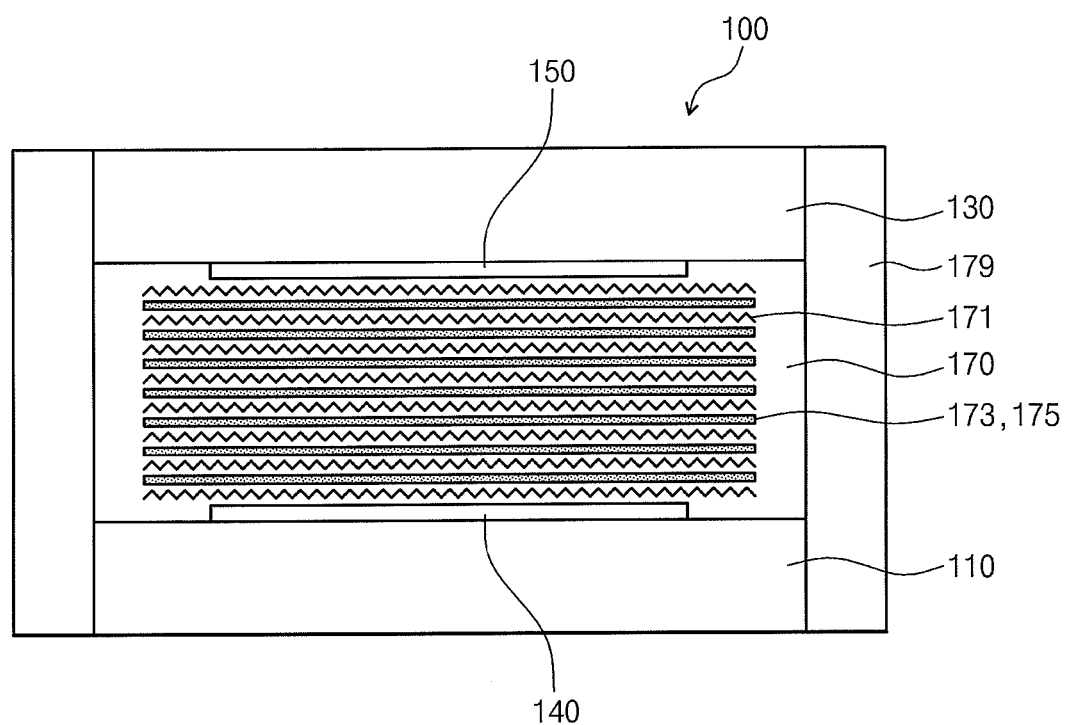
FIG. 2 is a sectional view illustrating the electrophoretic display apparatus according to an exemplary embodiment of the present invention.

As shown in FIG. 2, the distribution of the non-polar solvent 171 between the two electrodes 140,150 is continuous and the polar solvent 173 capable of dissolving the dye 175 forms the emulsion 170 with the non-polar solvent 171 in the non-polar solvent 171.

Figure 3:
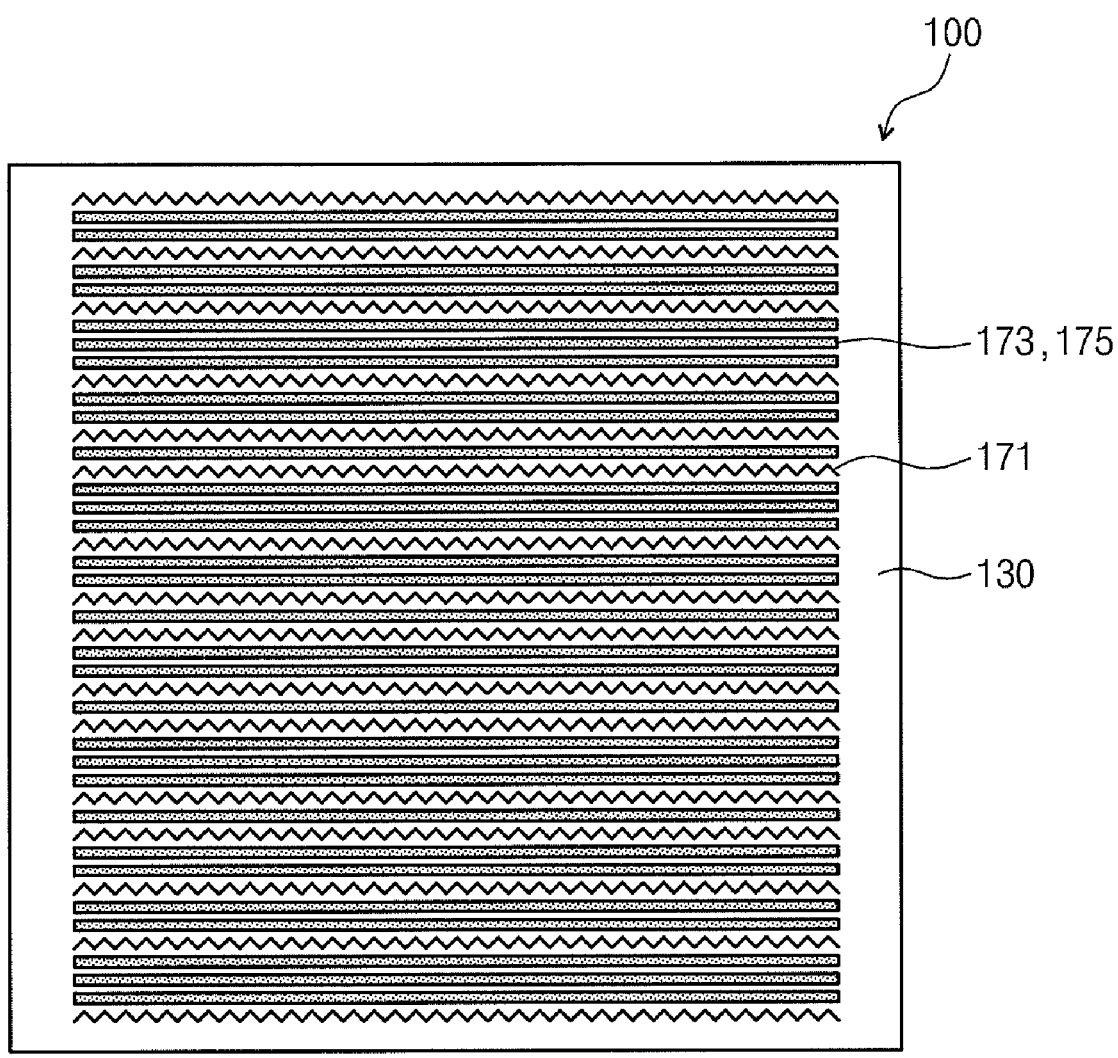
FIG. 3 is a planar view illustrating the front surface of the electrophoretic display apparatus as shown in FIG. 2.

FIG. 3 is a view illustrating the image display region of the front surface of the electrophoretic display apparatus 100 as shown in FIG. 2, wherein the distribution of the polar solvent 173 is continuous in the non-polar solvent 171. As shown in FIGS. 2 and 3, when the colored polar solvent 173,175 is homogeneously dispersed in the non-polar solvent 171 and is distributed totally in the non-polar solvent, the electrophoretic display apparatus 100 may have the combined color of the dye 175, the polar solvent 173 and the non-polar solvent 171.

The polar solvent 173 containing the dye 175 and the surfactant form reverse micelles in the continuous phase of the non-polar solvent 171. The reverse micelles are formed by surrounding the polar solvent 173 with the surfactant in the continuous phase of the non-polar solvent 171. The surfactant allows the colored polar solvent 173, 175 to be readily dispersed totally in the non-polar solvent 171, so that the emulsion 170 has an opaque appearance as a whole. If the dye 175 is not used, the emulsion 170 has the combined color of the polar solvent 173 itself and the non-polar solvent 171.

In an exemplary embodiment of the present invention, the combination of the polar solvent 173, the dye 175 and the surfactant may be charged positively or negatively. Although each of the polar solvent 173, the dye 175 and the surfactant may be charged individually, any one ingredient may be charged to form a totally charged dispersed phase. The combination of the polar solvent 173, the dye 175 and the surfactant is charged positively or negatively as a whole so that the combination may move along an electric field once the electric field is applied.

For example, an exemplary embodiment of the combination of the polar solvent 173, the dye 175 and the surfactant, charged positively as a whole, will be explained hereinafter.

Figure 4:
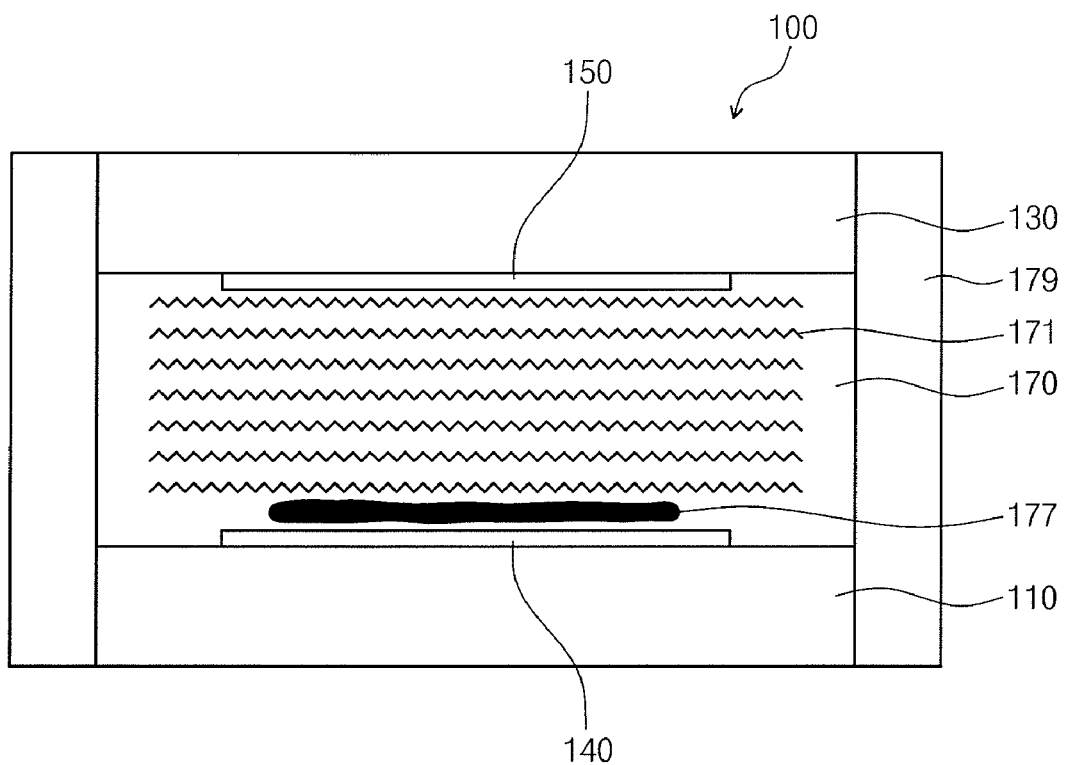
FIG. 4 is a sectional view illustrating the electrophoretic display apparatus according to an exemplary embodiment of the present invention, when a voltage is applied to the first electrode and the second electrode.

FIG. 4 is a sectional view illustrating the electrophoretic display apparatus according to an exemplary embodiment of the present invention, when a voltage is applied to the first electrode and the second electrode. As shown in FIG. 4, when a voltage is applied to the first electrode 140 as a cathode and the second electrode 150 as an anode, an electric field is formed between the two electrodes 140,150.

As the above combination is charged positively as a whole, it moves toward the first electrode 140 as a cathode by way of an electric attraction force. The polar solvent molecules reaching the first electrode 140 are conglomerated with each other to form larger droplets 177. Herein, the droplets 177 have a variable shape depending on the shape of the first electrode. For example, when the first electrode is a linear electrode, the droplets may be formed in the shape of needles.

On the contrary, when the above combination is charged negatively, the combination may continuously move toward the second electrode 150 as an anode by way of an electric attraction force and form droplets near the second electrode 150. Additionally, voltage application may be performed in such a manner that the two electrodes are charged oppositely to the above described embodiment (e.g. the first electrode 140 functions as an anode, while the second electrode 150 functions as a cathode). In this case, the droplets may be conglomerated on the oppositely charged electrode selected from the first electrode 140 and the second electrode 150.

When the polar solvent 173 dispersed in the non-polar solvent forms larger polar solvent droplets 177 under the application of a voltage, a droplet-free gap may be formed between one droplet 177 and the adjacent droplet 177, the droplet-free gap consisting of the non-polar solvent 171, e.g., the continuous phase only. In other words, there may be a visible gap a light passing directly through the two substrates 110,130 while the light is not passing through the conglomerated droplets 177.

Figure 5:
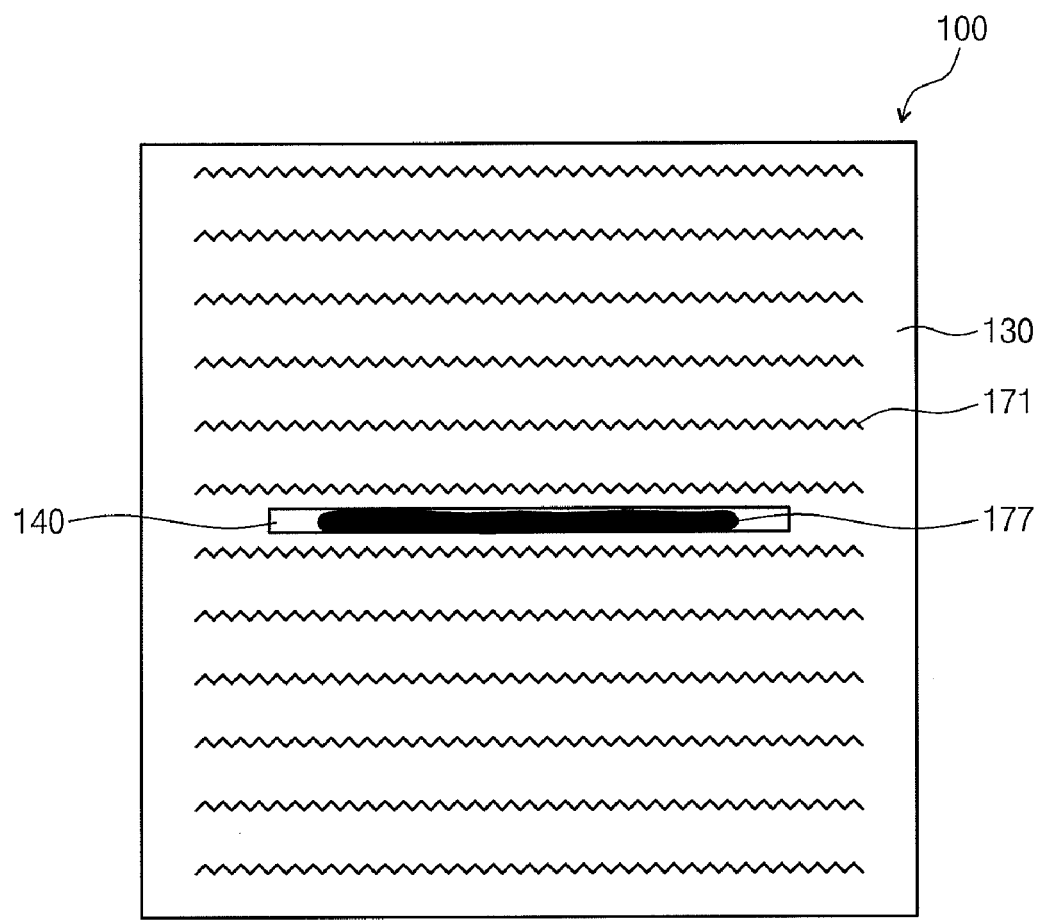
FIG. 5 is a front view of the electrophoretic display apparatus to which a voltage is applied as shown in FIG. 4.

FIG. 5 is a view illustrating the image display region of the front surface of the electrophoretic display apparatus, to which a voltage is applied, as shown in FIG. 4, and shows the distribution of the polar solvent droplets 177 in the non-polar solvent 171 when the first electrode 140 has a linear shape. As shown in FIG. 5, the gaps between the larger droplets 177 of the polar solvent allow the electrophoretic display apparatus 100 to realize the color of the non-polar solvent 171, as a whole.

Figure 6:
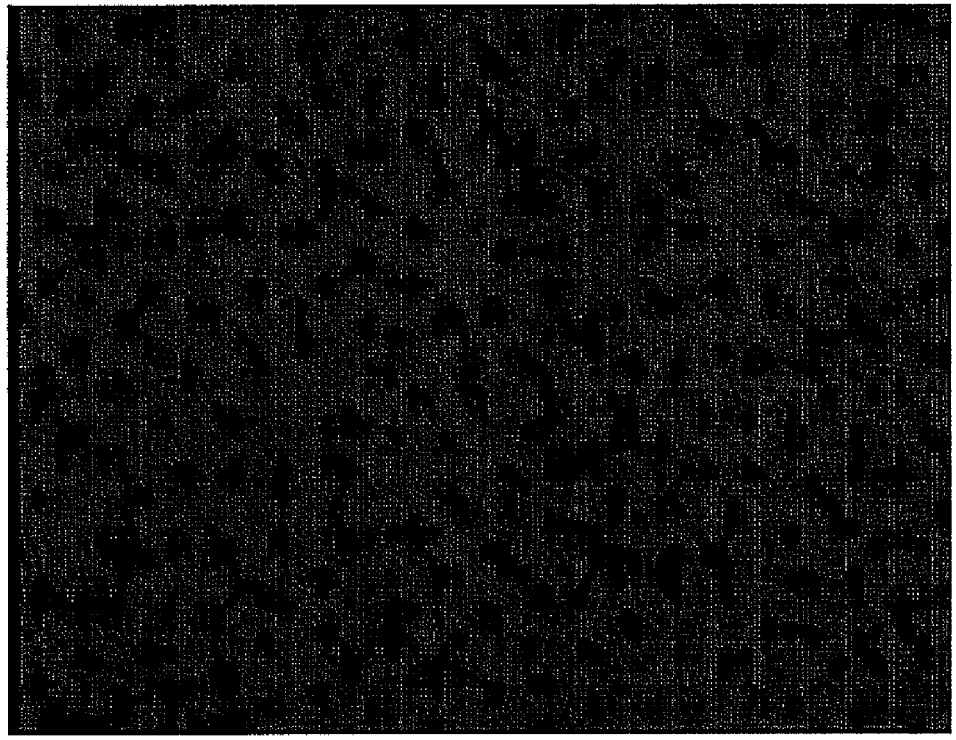
FIG. 6 is a photographic view showing the shape of droplets when the first electrode takes a planar form.

However, for example, when the first electrode 140, on which the droplets 177 are conglomerated, is formed to have a planar shape, the larger droplets 177 may be gradually conglomerated to a diameter up to about 5 µm due to the lack of the definition of polarization points. FIG. 6 is a photographic view illustrating the shape of droplets when the first electrode 140 is formed to have, for example, a planar shape, wherein the droplets have a diameter of about 5 µm.

FIGS. 7A-7D are sectional views illustrating how droplets 177 are conglomerated increasingly on the first electrode 140, when the first electrode is formed to have a planar shape by using a conductive material. For the sake of convenience, the polar solvent 173 is represented by a single dot. It is shown that a plurality of dots is conglomerated into larger droplets 177 as compared to individually dispersed dots. In the figures, although larger droplets are represented by a plurality of 'dots' combined with each other for the sake of convenience, it is to be noted that polar solvent molecules 173, which otherwise would be individually dispersed in the non-polar solvent, are conglomerated into substantially larger droplets 177.

Figure 7A:
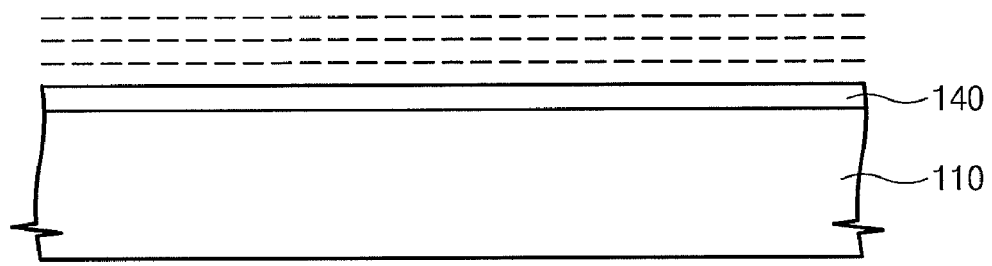
FIGS. 7A-7D are sectional views illustrating how droplets are conglomerated increasingly on the planar electrode.
Figure 7B:
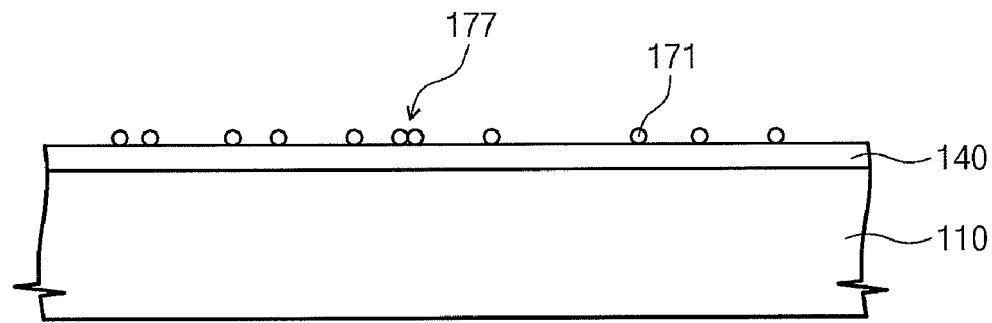
Figure 7C:
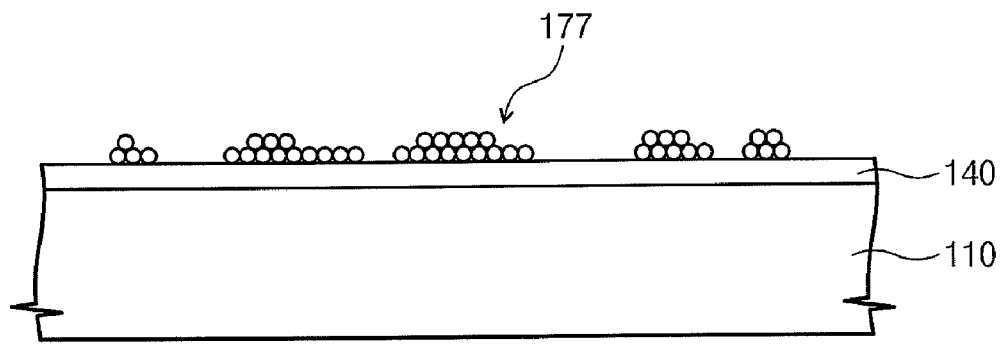
Figure 7D:
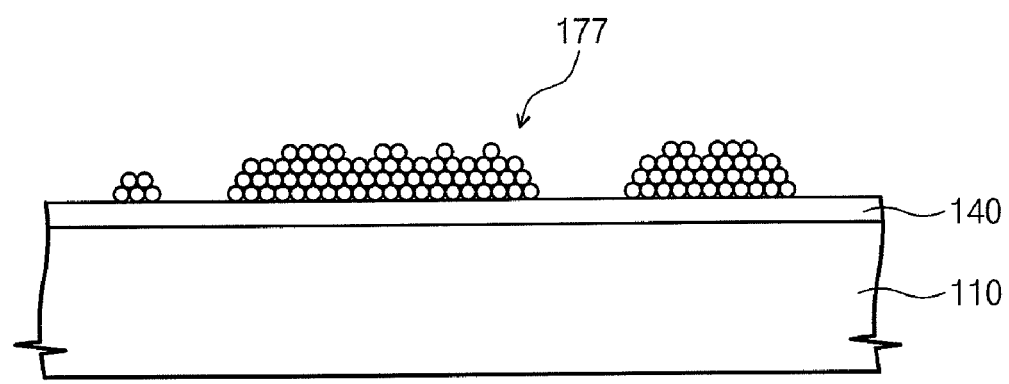

As shown in FIGS. 7A-7D, when a voltage is applied to the first electrode 140 formed on the first substrate 110, the whole surface of the first electrode has the same electric potential (shown as dotted lines) because the whole of the first electrode is a conductor (see FIG. 7A). The polar solvent 173 is attached randomly to any places by the planar electric field equivalently formed on the whole surface (see FIG. 7B).

Next, the polar solvent 173 attached to any places randomly is polarized so as to act just like a part of the electrode. Therefore, an electric potential is formed along the surface and functions as the surface of the electrode, so that the electric field around the polar solvent attached to any places becomes non-uniform. As a result, as a higher electric potential exists around the polarized polar solvent, the polar solvent molecules 173 conglomerated subsequently on the electrode may be attached to the surface of the polar solvent 173, thereby forming bigger droplets 177 (see FIG. 7C). Then, the polar solvent conglomerate may be polarized again and function as the surface of the electrode.

When the polar solvent 173 is conglomerated continuously on the electrode, the droplets 177 formed by the polar solvent 173 may gradually grow toward the lateral sides and top. As the positions of the droplets formed are arbitrary, droplets 171 may be continuously combined with the adjacent droplets 171 to form increasingly larger droplets 177 easily (see FIG. 7D).

In the electrophoretic display apparatus as described above, smaller droplets 177 may provide shorter light transmission paths, thereby providing high transparency. Considering this, when the droplets grow above a predetermined size, the electrophoretic display apparatus may provide very low transparency. In fact, for example, the droplets formed through the above-mentioned process may have a diameter up to about 5 µm, thereby resulting in a drop in transparency to about 50% or less.

Therefore, the electrophoretic display apparatus 100 according to an exemplary embodiment of the present invention allows for the formation of droplets 177 having, for example, a diameter below about 5 µm to thereby provide increased transparency.

For example, to form droplets 177 smaller than droplets with a diameter of about 5 µm, the electrophoretic display apparatus according to an exemplary embodiment of the present invention may utilize the first electrode 140 including a plurality of nanoparticles 160 capable of varying the distribution of an electric field.

Of course, any one electrode may include a plurality of nanoparticles depending on the polarity of the applied voltage or the kind of the charge of the combination of the polar solvent, the dye, etc.

For example, the nanoparticles 160 that may be one of the nanomaterials having a one-dimensional structure and a diameter of about 100 nm or less include nanowires, nanorods, nanoribbons, carbon nanotubes, or the like. Although a bulk material maintains its physical properties at a micrometer scale, it may realize new physical properties at a nanometer-scale. For example, smaller materials such as nanoparticles exhibit a so-called quantum confinement effect. A prominent characteristic of the quantum confinement effect is that a band gap may increase as the size of a material decreases. By virtue of such a phenomenon inducing variations in band gaps depending on the size of a material, nanoparticles may be used widely as semiconductors or conductors by controlling the size of nanoparticles.

In the electrophoretic display apparatus according to an exemplary embodiment of the present invention, the nanoparticles are used as a part of the conductor with controlling size. For example, the first electrode 140 is formed by using the conductive nanoparticles and functions as an electrode. As a voltage is applied to the first electrode 140 including the nanoparticles, the voltage may also be applied to each nanoparticle 160 forming the first electrode 140. Herein, due to the unique characteristics of the nanoparticles 160, the electric charges of the first electrode 140 may be formed on the surface of the nanoparticles 160 while the voltage being applied. Thus, according to the alignment of the nanoparticles 160, an electric field may be formed on the surface of the nanoparticles. As described before, when the first electrode is a conventional transparent planar electrode including a metal oxide, an electric field may be formed on the surface of the electrode itself in parallel with the same.

In addition to the nanoparticles 160, the first electrode 140 may further include a support 161 that supports the nanoparticles. The support 161 may be formed by using, for example, a filler such as a resin and serves to support the nanoparticles 160.

The electrode 140 including the nanoparticles 160 functions as the first electrode 140 while forming randomly oriented networks, wherein the gap between one nanoparticle 160 and the adjacent nanoparticle 160 is less than, for example, about 5 μm. Additionally, the nanoparticles 160 are crosslinked or interconnected with each other along random directions. Therefore, a non-uniform electric field may be formed locally at the position of the individual nanoparticle 160, while a relatively uniform electric field may be formed on the whole surface of the first electrode 140 in a broad view. FIGS. 8A-8D are sectional views illustrating how droplets 177 are conglomerated on the first electrode 140 including the nanoparticles 160.

Referring to FIGS. 8A-8D, the first electrode 140 is formed on the first substrate 110, and the first electrode includes a plurality of nanoparticles 160. When a voltage is applied, the nanoparticles 160 may cause the formation of an electric field on the surface of the first electrode 140, the electric field having non-uniform surface electric potentials (as represented by dotted lines) that are not in parallel with the surface of the first electrode 140 (see FIG. 8A).

Figure 8A:
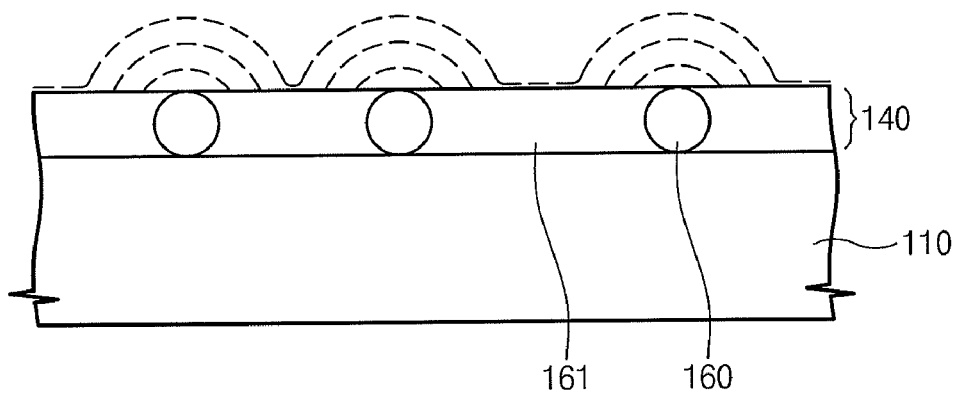
FIGS. 8A-8D are sectional views illustrating how droplets are conglomerated on the planar electrode including nanoparticles.
Figure 8B:
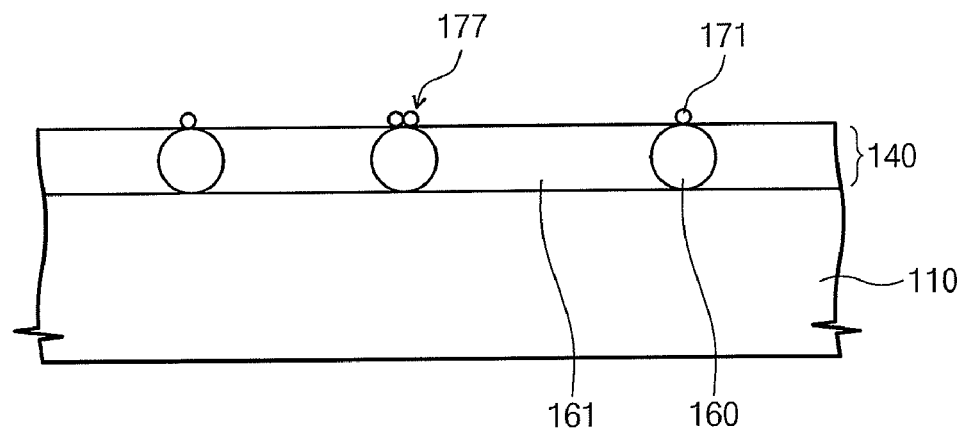

Therefore, when an electric field is formed between the first electrode 140 and the second electrode 150, the polar solvent 173 dispersed in the emulsion may be conglomerated on the oppositely charged first electrode 140, particularly on the surface of the nanoparticles (see FIG. 8B).

Figure 8C:
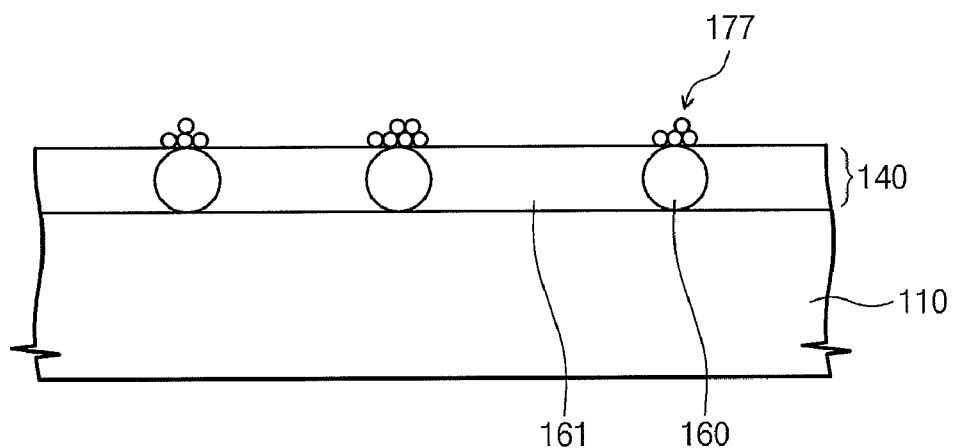

When, the polarized polar solvent 173 is further attached to the first electrode, the polar solvent is aligned on the droplet 177 preliminarily existing on the surface of the nanoparticles 160 (see FIG. 8C).

Figure 8D:
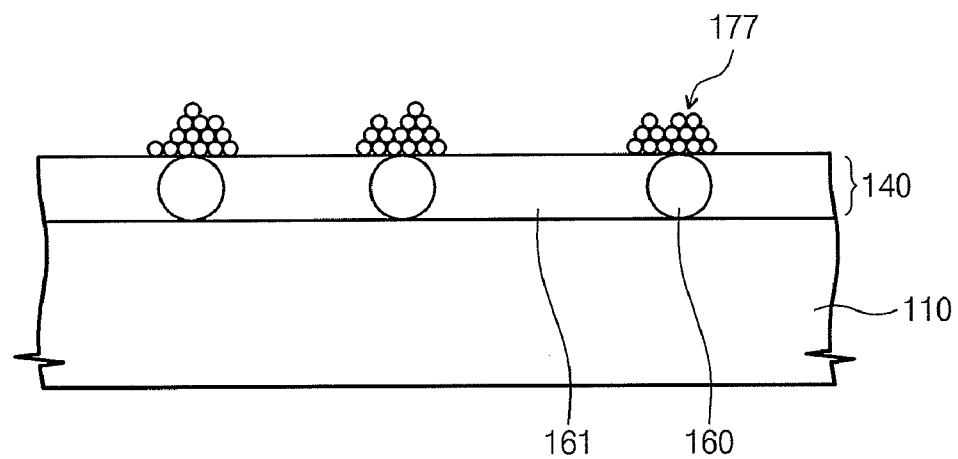

While the above process is repeated, the droplets 177 may be repeatedly formed on the nanoparticles 160 and may grow toward the upper side (see FIG. 8D).

As a result, the droplets 177 may be formed to have a relatively small size along the curve of the electric field formed by the nanoparticles 160. For example, as the interval between one nanoparticle 160 and the adjacent nanoparticle 160 is less than about 5 μm, relatively smaller droplets 177 are formed on the nanoparticles 160 at an interval less than about 5 μm.

For example, the interval between one nanoparticle and the adjacent particle may be about 200 nm or less. This is because the visible rays have a wavelength of about, for example, 380 nm-770 nm. When the interval is, for example, less than a half of the wavelengths of the visible rays, droplets 177 with a size of about 200 nm or less are formed according to the alignment of the nanoparticles 160. Therefore, the droplets may not be seen by the naked eyes, thereby resulting in a significant increase in the transparency.

Additionally, in the above-described exemplary embodiment, the nanoparticles 160 preferably have a diameter of, for example, about 100 nm or less. This is because a larger diameter of the nanoparticles 160 leads to a larger diameter of the droplets 177 conglomerated on the nanoparticles 160. The nanoparticles 160 may have a much smaller particle size as long as they can be formed in a nano-scale. If necessary, the nanoparticles may have a size of, for example, about 1 nm.

As a result, the electrophoretic display apparatus according to an exemplary embodiment of the present invention can provide improved transparency due to a relatively smaller size of the droplets 177 as compared to the conventional electrophoretic display apparatus using no nanoparticles, thereby realizing an increased contrast.

Figure 9A:
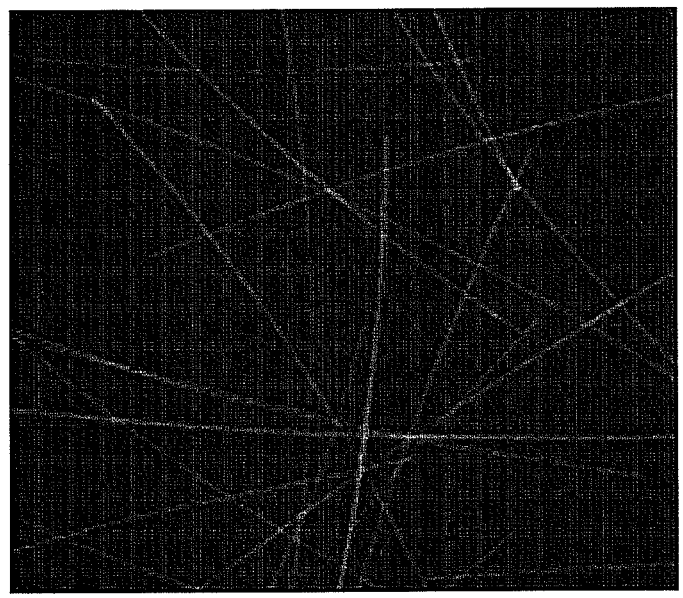
FIGS. 9A and 9B are photographic views showing nanowires and carbon nanotubes used according to an exemplary embodiment of the present invention, respectively, taken by scanning electron microscopy (SEM).
Figure 9B:
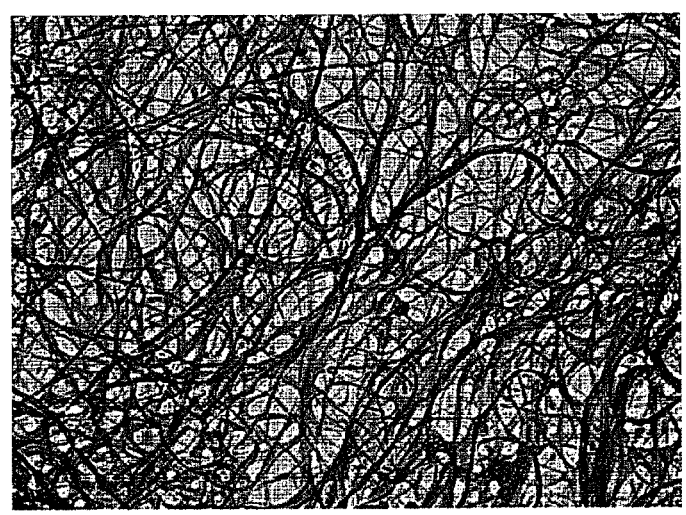

FIGS. 9A and 9B are photographic views showing nanowires and carbon nanotubes used according to some exemplary embodiments of the present invention, respectively, taken by scanning electron microscopy (SEM). As can be seen therefrom, both the nanowires and the carbon nanotubes may have a network structure. The nanowires or the carbon nanotubes extend along random directions and are crosslinked or interconnected with each other. Thus, they form a non-uniform electric field in a microscopic view, while forming a uniform electric field in a macroscopic view. As a result, the nanowires or the carbon nanotubes serve to form fine droplets while inhibiting growth of the droplets beyond a predetermined size, thereby increasing the transparency.

The nanoparticles including the nanowires or carbon nanotubes may be obtained, for example, via a sol process, micelle process, sol-gel process, chemical synthesis, hydrothermal synthesis, pyrolysis, chemical vapor deposition, physical vapor deposition, or the like. For example, nanoparticles including the nanowires or carbon nanotubes may be dispersed into an adequate solvent and coated onto a substrate in a liquid state, or may be formed directly on a substrate. However, there is no particular limitation in the method of forming the nanoparticles on the substrate. For example, preformed nanoparticles may applied onto the substrate by way of a spin coating or ink jet printing process. At this time, the nanoparticles may have a controlled concentration so that the interval between one nanoparticle and the adjacent nanoparticle is controlled.

The electrophoretic display apparatus according to an exemplary embodiment of the present invention may be utilized as a flexible display apparatus. In other words, at least one of the first substrate and the second substrate may be formed by, for example, using a flexible material such as a plastic material to increase the softness of the display apparatus itself. In this manner, the electrophoretic display apparatus may have a wide spectrum of applications.

For example, although the electrophoretic display apparatus of exemplary embodiments of the present invention described herein includes nanoparticles to cause a variation in the electric field formed by the electrodes, the nanoparticles may be substituted with protrusions capable of substantially varying the electric field. In other words, a conductor is used on any one of the first electrode and the second electrode, where the polar solvent of the emulsion is conglomerated, to form protrusions having a diameter (e.g. about 100 nm or less) similar to the diameter of the nanoparticles at an interval (e.g. about less 5 μm) similar to the interval of the nanoparticles. In this case, the protrusions may form a part of the electrode and form an electric field like the nanoparticles, thereby providing the same effect as described above.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. An electrophoretic display apparatus comprising:
a first electrode comprising a plurality of nanoparticles;
a second electrode opposite to the first electrode and forming an electric field with the first electrode; and
an emulsion interposed between the first electrode and the second electrode,
wherein the emulsion comprises a non-polar solvent forming a continuous phase of the emulsion, and a polar solvent dispersed in the non-polar solvent of the emulsion and forming droplets controlled by the electric field.

2. The electrophoretic display apparatus of claim 1, wherein the polar solvent further comprises a dye that is not soluble in the non-polar solvent.

3. The electrophoretic display apparatus of claim 2, wherein the dye comprises at least one dye selected from the group consisting of monazo dyes, diazo dyes, triphenylmethane dyes, pyrazolone dyes, acridines, porphyrines, diformazan dyes, squarain dyes, oxazines, formazan dyes, colored metal and transition metal complexes, metal salts, acid anthraquinone dyes, amphoteric anthraquinone dyes, diphenylmethane dyes, polymethine dyes, thiazines, phthalocyanines, tetrazolium dyes and combinations thereof.

4. The electrophoretic display apparatus of claim 1, wherein the polar solvent comprises a charge.

5. The electrophoretic display apparatus of claim 4, wherein the first electrode is an electrode charged oppositely to the charged polar solvent.

6. The electrophoretic display apparatus of claim 1, wherein the nanoparticles comprise at least one type of non-particle selected from the group consisting of nanowires, carbon nanotubes, nanorods and nanoribbons.

7. The electrophoretic display apparatus of claim 6, wherein the nanoparticles comprise nanowires having a diameter of about 100 nm or less.

8. The electrophoretic display apparatus of claim 1, wherein the nanoparticles comprise an interval of less than about 5 μm between one nanoparticle and an adjacent nanoparticle.

9. The electrophoretic display apparatus of claim 8, wherein the interval between one nanoparticle and the adjacent nanoparticle is less than about 200 nm.

10. The electrophoretic display apparatus of claim 1, wherein the emulsion further comprises a surfactant.

11. The electrophoretic display apparatus of claim 10, further comprising reverse micelles formed by the surfactant and the polar solvent in the non-polar solvent.

12. The electrophoretic display apparatus of claim 1, wherein the non-polar solvent comprises at least one solvent selected from the group consisting of $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{2-30}$ esters, $C_{3-30}$ thioesters, terpenes, $C_{2-30}$ organosilanes, $C_{2-30}$ organosiloxanes and combinations thereof.

13. The electrophoretic display apparatus of claim 1, wherein the polar solvent includes at least one solvent selected from the group consisting of alcohols, amines, amides, ketones, carboxylic acids and their salts, glycols, polyethers, sulfides, sulfonic acid and their salts, sulfates, phosphides, phosphites, phosphonites, phosphinites, phosphates, phosphonates, phosphinates, imides, nitriles, isonitriles, amidines, nitro compounds, nitroso compounds, sulfoxides, sulfonates, thiols, water and combinations thereof.

14. The electrophoretic display apparatus of claim 13, wherein the polar solvent comprises at least one solvent selected from the group consisting of DMSO (dimethyl sulfoxide), DMF (dimethyl formamide), methanol, ethanol, nitromethane, acetonitrile, methoxyethanol, methyl cellosolve, monoethyl ether and combinations thereof.

15. The electrophoretic display apparatus of claim 1, wherein the first electrode further comprises a support that supports the nanoparticles.

16. The electrophoretic display apparatus of claim 15, wherein the support comprises a filler including a resin.

17. The electrophoretic display apparatus of claim 1, further comprising a first substrate in contact with outer surface of the first electrode and a second substrate in contact with outer surface of the second electrode.

18. The electrophoretic display apparatus of claim 17, further comprising a thin film transistor on the first substrate, wherein the thin film transistor is connected to the first electrode to apply a voltage thereto.

19. The electrophoretic display apparatus of claim 17, wherein the at least one of the substrates is a flexible substrate.

20. The electrophoretic display apparatus of claim 1, wherein the polar solvent comprises a color such that it functions as both a dye and the polar solvent.

* * * * *